(12) United States Patent
Studer

(10) Patent No.: US 6,293,731 B1
(45) Date of Patent: Sep. 25, 2001

(54) METHOD FOR TREATMENT OF DREDGED MATERIALS TO FORM A STRUCTURAL FILL

(75) Inventor: Ritchie G. Studer, Dallas, TX (US)

(73) Assignee: SK Services (East) LC, Columbia, SC (US)

( * ) Notice: Subject to any disclaimer, the term of this patent is extended or adjusted under 35 U.S.C. 154(b) by 0 days.

(21) Appl. No.: 09/080,062

(22) Filed: May 15, 1998

Related U.S. Application Data

(60) Provisional application No. 60/046,616, filed on May 15, 1997.

(51) Int. Cl.[7] .................................................. B09B 1/00
(52) U.S. Cl. ................... 405/129.2; 405/129.25; 405/128.15; 405/128.5; 106/97; 210/752
(58) Field of Search .................. 405/128, 129, 405/266, 270, 267, 128.1, 128.15, 128.45, 128.5, 128.7, 128.75, 129.1, 129.2, 129.25, 129.55, 129.65; 588/252, 257; 106/89, 117, 697, 803, 739; 210/752

(56) References Cited

U.S. PATENT DOCUMENTS

| | | | |
|---|---|---|---|
| 3,947,284 | * 3/1976 | Kirsugi et al. | 106/89 |
| 3,975,266 | * 8/1976 | Baize | 210/10 |
| 4,129,449 | * 12/1978 | Kojima | 405/266 X |
| 4,149,968 | * 4/1979 | Kupiec et al. | 405/128 X |
| 4,230,568 | * 10/1980 | Chappell | 210/751 |
| 4,443,260 | * 4/1984 | Miyoshi et al. | 106/89 X |
| 4,460,292 | * 7/1984 | Durham et al. | 405/129 |
| 4,465,518 | * 8/1984 | Miyoshi et al. | 106/89 |
| 4,482,271 | * 11/1984 | Mitchell et al. | 405/157 |
| 4,504,321 | * 3/1985 | Kapland et al. | 106/117 |
| 4,539,121 | * 9/1985 | Kapland et al. | 106/751 |
| 4,744,829 | * 5/1988 | Eirich et al. | 106/118 X |
| 5,240,608 | * 8/1993 | Gurfinkel et al. | 106/739 X |
| 5,266,494 | * 11/1993 | Lahoda et al. | 436/57 |
| 5,304,701 | * 4/1994 | Kigel et al. | 588/257 |
| 5,419,839 | * 5/1995 | Haley et al. | 210/751 |
| 5,489,741 | * 2/1996 | Weszley | 405/128 X |
| 5,587,947 | * 12/1996 | Studer et al. | 588/252 |
| 5,868,940 | * 2/1999 | Gurfinkel | 106/739 X |

* cited by examiner

Primary Examiner—David Bagnell
Assistant Examiner—Jong-Suk Lee
(74) Attorney, Agent, or Firm—Vedder Price Kaufman & Kammholz

(57) ABSTRACT

A method for treating materials dredged from a waterway, such as a harbor or channel, and forming a mixture suitable for beneficial re-use as structural fill. The dredged materials (28) may be placed in a treatment vessel (26) which transports the dredged materials (28) through a plurality of processing stages including a dewatering stage, a debris removal stage, a fixation, stabilization and solidification stage, a curing stage, and an offloading stage. The fixation, stabilization and solidification stage involves adding a cement type additive such as Portland Cement along with other additives which stabilize the dredged materials by chemical fixation and solidification to form the structural fill.

12 Claims, 11 Drawing Sheets

METHOD FOR TREATMENT OF DREDGED MATERIALS TO FORM A STRUCTURAL FILL

CROSS REFERENCES TO RELATED APPLICATIONS

This application claims the benefit of U.S. Provisional Application No. 60/046,616 filed May 15, 1997.

TECHNICAL FIELD OF THE INVENTION

This invention relates in general to the fixation, stabilization and solidification of materials dredged from a waterways and, in particular to, a method for processing the dredged materials to form a mixture suitable for a beneficial re-use as a structural fill.

BACKGROUND OF THE INVENTION

The waterways of the United States have served many practical needs, such as large-scale transportation of both commodities and manufactured goods, recreational activities, water front living environments, and oil, gas and mineral supplies. The utilization of these waterway resources has involved the construction and maintenance of many structures including harbors, locks, canals, marinas, breakwaters, shore protection and water intakes so that, among other things, ships and marine equipment may be operated in all kinds of weather conditions. It is estimated that up to 95 percent of the commerce in the United States depends on ocean transportation. For example, in 1994, 4,537 ships were called at port in New York Harbor, each carrying the equivalent of 1,000 railcars or 2,000 trucks which represents 12 percent of the total ocean commerce in the United States.

It has been found, however, that dredging is often required to maintain water depth in waterways such as harbors and channels. For example, New York Harbor is a natural shallow estuary fed by the Hudson, Passaic and Hackensack Rivers. It receives between about three and five million cubic yards of sediment drift each year, creating shoals that threaten to block its 240 miles of navigational channels. The natural depth of New York Harbor is only about 18 feet, while most cargo ships require at least a 40-foot draft.

The build up of sediment further decreases the depth of New York Harbor and, thus, large fully loaded container ships may no longer be accommodated. As a result, many vessels must unload part of their cargo on barges in deeper parts of the Harbor or at other ports. After lightening, the container ships float high enough in the water to be docked. Similarly, oil tankers must perform a procedure called "lightering" in which some of the crude oil is pumped into smaller barges out in the ocean. These types of procedures greatly impact the cost of transportation as well as increasing the risk of environmental contamination from oil spills. As such, the livelihood of harbors, such as New York Harbor, depends on the continued clearing of silt therefrom.

It has been found, however, that dredged sediments are often contaminated with pollutants. Specifically, dioxins, PCBs, heavy metals including lead, mercury and cadmium, pesticides, as well as other contaminants from waste water discharges and run off attach themselves to the silt that washes into harbors. In the past, silt and muck dredged up from the port of New York and New Jersey has been dumped in the ocean in a 2.2 square mile area known as the Mud Dump.

Since 1977, the Environmental Protection Agency ("EPA") has been testing sediment that is dumped into the ocean using a pass/fail test. The EPA's regional office in New York, however, enforces a more stringent guideline for New York Harbor. Dredged materials are classified into three categories: Category I means the sediment is clean enough to dump in the ocean; Category II mud has trace levels of chemicals which could formerly be dumped in the ocean and "capped" with clean sand but presently has been barred from disposal in the Mud Dump; and Category III is so contaminated that federal law prohibits ocean disposal. It has been estimated by the Army Corp of Engineers that two-thirds of the sediment in New York Harbor falls within Category III. An additional 20 percent of the sediment falls within Category II.

A variety of prior methods have been used to clear silt from navigational channels that do not require dumping the dredged materials into the ocean. For example, efforts have been made to level or reprofile the accumulated silt rather than removing it. At best, this approach yields a short term solution given the volume of sediment drift into harbors and channels. Other alternatives have been suggested to dispose of dredged materials. For example, digging an underwater pit to bury dredged materials that have been packaged in large containers or building a contaminant island to store the dredged material. Digging an underwater pit, however, could disturb heavy metals such as mercury, lead and cadmium below the sea floor and would require several years to prepare. Similarly, constructing a contaminant island may cost between $500 million and $1 billion and would take more than five years to prepare.

Alternatively, dredged materials have been transferred to landfills or other on land sites for disposal. This approach, however, may cost more than 20 times that of dumping in the ocean and requires the transfer and transportation of contaminated materials which creates a separate and further environmental risk. Additionally, prior methods for re-use of the dredged materials have not been successful. For example, prior attempts to use dredged material for resurfacing roads have yielded an asphalt with a limited life due to the low durability and friability of the end product.

Therefore, a need has arisen for a method and associated apparatus for the treatment of dredged materials that is cost effective on a large scale, that is environmentally sound and that creates a mixture that is suitable for a beneficial re-use as a structural fill.

SUMMARY OF THE INVENTION

The present invention disclosed herein comprises a process and the associated apparatus for treatment of dredged materials that is cost effective on a large scale, that is environmentally responsible and that produces a mixture that is suitable for beneficial re-use as a structural file.

The process of the present invention involves dredging materials such as sediment or silt that has been deposited in navigable waterways such as channels, harbors, lakes and rivers. Dredging may be accomplished using a dredging vessel having an engineering clamshell which deposits the dredged material into a treatment vessel, such as a barge or scow. The dredged materials in the treatment vessel are then dewatered and debris is removed therefrom.

An additive is then blended thoroughly into the dredged materials in the treatment vessel. Mixing of the additives into the dredged material is accomplished using a mixing assembly which may have horizontal or vertical mixing systems. Thereafter, the curing process effectively completes the dewatering of the dredged materials, immobilizes the metals and organic constituents in the dredged materials, and creates a highly impermeable structural fill material which may be used as a cap for a landfill, as the site for the construction of a building or as a paving material for parking lots, airfield construction, road base or other Department of Transportation projects.

The treatment of dredged materials in a treatment vessel allows for the processing of contaminated dredged materials following a single move of the dredged materials from the waterway into the treatment vessel. This process not only minimizes the costs associated with moving the dredged materials from one containment vehicle to another, but also, minimizes the environmental impact associated with each move. The fixation, stabilization and solidification process of the present invention also physically and chemically transforms the dredged materials into a structural fill which has beneficial reuse applications and avoids the need and cost for dumping the dredged materials into the ocean or a landfill.

BRIEF DESCRIPTION OF THE DRAWINGS

For a more complete understanding of the present invention, including its features and advantages, reference is now made to the detailed description of the invention, taken in conjunction with the accompanying drawings in which like numerals in different drawings represent like parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

The present invention involves fixation, stabilization and solidification of dredged materials in an environmentally responsible manner requiring a minimum handling of the dredged materials prior to stabilization and avoiding the need for landfill or ocean dumping of the dredged materials.

Figure 1:
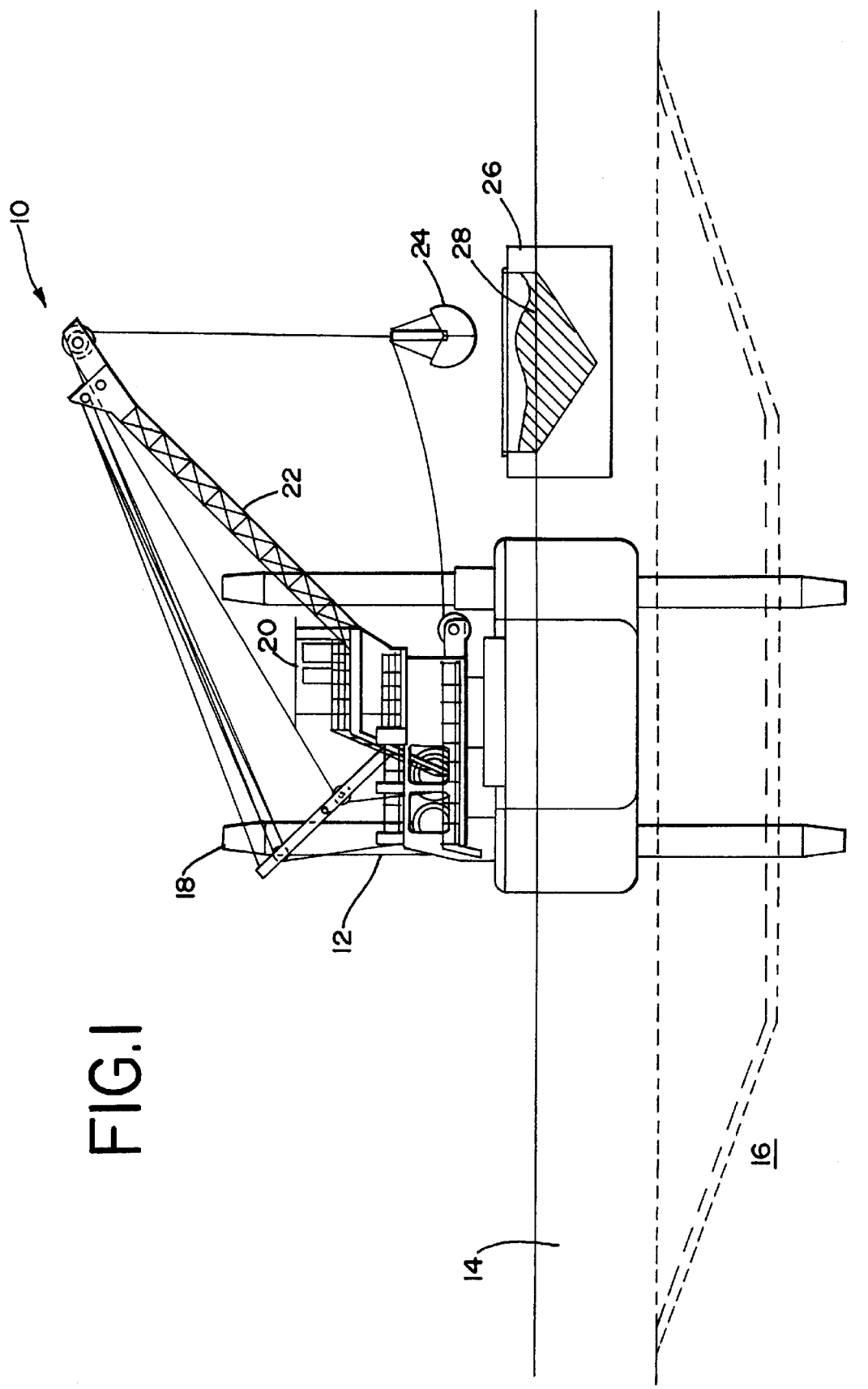
FIG. 1 is a schematic illustration of a dredging vessel centered over a waterway loading dredged materials into a treatment vessel.

FIG. 1 depicts a dredging operation that is generally designated 10. A dredging vessel 12 is positioned in a waterway 14 such as a harbor or channel in which sediment 16 has accumulated. Once the dredging vessel 12 is in position in the waterway 14, support members such as legs 18, spuds or anchors may be extended into the sediment 16 to position the dredging vessel 12 which may be, for example, a barge or scow. The dredging vessel 12 may use a crane 20 with a boom 22 to control the position of a clamshell 24 as the sediment 16 is removed from the bottom of the waterway 14 and placed in a treatment vessel 26. Once in the treatment vessel 26, the sediment 16 will be referred to herein as dredged materials 28. It should be noted that dredged materials 28 may typically include sands, silts, clays and other materials in addition to sediment 16 that is removed from the subaqueous location such as waterway 14.

When performing the dredging operation 10 in an environmentally sensitive area or when the sediment 16 contains contaminants from waste water discharge or runoff such as dioxin, PCBs, heavy metals such as lead, mercury or cadmium or pesticides, specialized dredging practices may be used to help minimize the creation of suspended sediment 16. For example, the clamshell 24 may be a closed environmental type clamshell and the bite of the clamshell 24 may be maximized to reduce the number of bites needed to move a set volume of sediment 16. The treatment vessel 26 used for the movement of the dredged materials 28 is typically a solid hull scow.

The need for dredging the waterway 14 typically arises due to the constant sediment drift from interconnective rivers or other runoff which feed into the waterway 14. Most modern cargo ships presently require at least a 40-foot draft. The new generation of cargo ships generally require a 45-foot draft and future ships are being designed to require even larger drafts. Thus, the need for dredging operations to maintain the depth of waterway 14 will continue.

Even though FIG. 1 depicts dredging operation 10 as using the dredging vessel 12 in conjunction with the clamshell 24, it should be noted by one skilled in the art that other mechanical types of dredging apparatus may be used, which are well known in the art, without departing from the principles of the present invention, such as a backhoe or a dipper. In addition, other type of dredging techniques may be used that will fall within the scope of the present invention, including, but not limited to, the use of hopper dredges and hydraulic dredges. The hopper dredges utilize a self-propelled vessel with a hollow hull into which dredged materials 28 are suctioned hydraulically through dragarms. The hydraulic dredges remove sediment 16 using revolving cutterheads to cut and churn sediment 16 and hydraulically pump sediment 16 by pipe to treatment vessel 26.

Even though FIG. 1 depicts treatment vessel 26 as an ocean-going vessel, it should be noted by one skilled in the art that alternative types of treatment vessels may be used, without departing from the principles of the present invention including, but not limited to, a land based containment vessel or a pit type containment vessel wherein treatment of the dredged materials 28 may occur.

Figure 2:
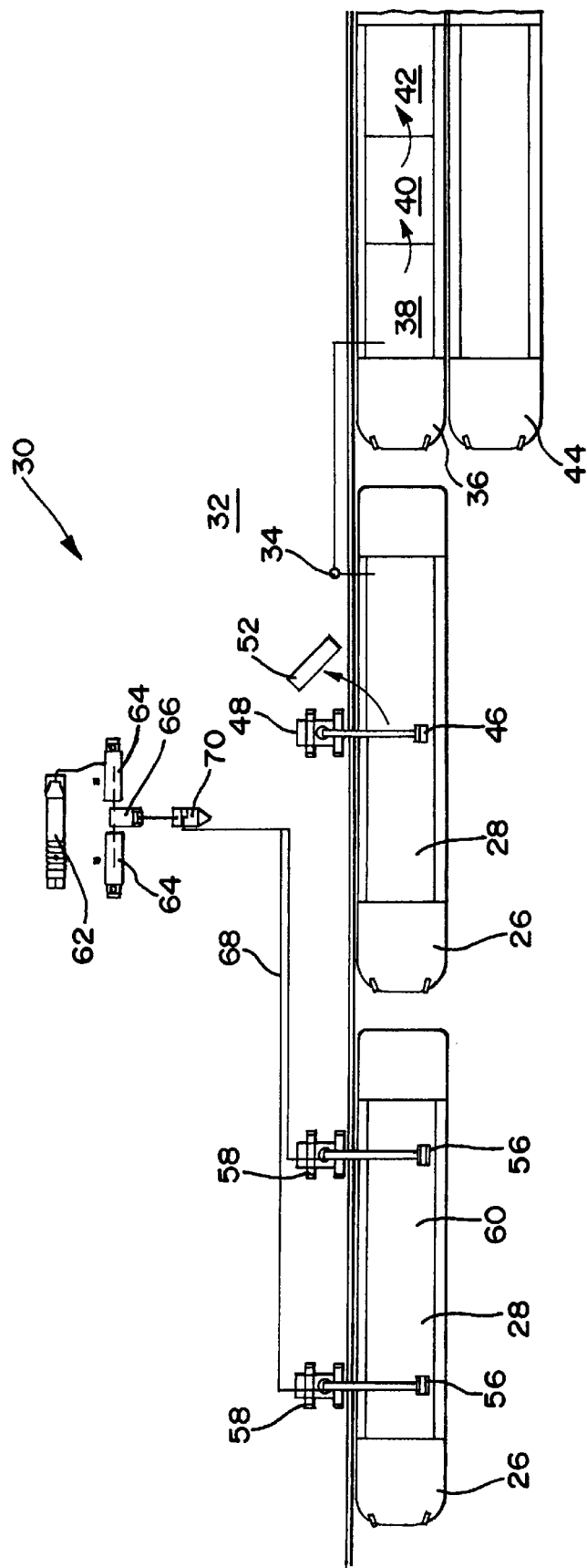
FIG. 2 is a schematic illustration of the processing steps for dredged materials of the present invention.

As depicted in FIG. 2 and after the treatment vessel 26 is filled with the dredged materials 28, the treatment vessel 26 is towed to a processing area which is generally designated 30. For example, the treatment vessel 26 may be towed to a location near a dock 32 or adjacent to another barge (not pictured). Once in place, free standing water is removed from the treatment vessel using pump 34. The free standing water is pumped into a decant barge 36 which has a plurality of staging units. The water from the pump 34 enters a settling tank 38 wherein gross separation of suspended sentiment 16 from the free standing water takes place. The residence time within settling tank 38 is determined based upon the amount and type of sediment 16 suspended in the water.

After a sufficient time, water from settling tank 38 may spill over into a first polishing tank 40 for further gravitational separation of the constituents in the water. After a sufficient residence time in polishing tank 40, the water may spill over into a second polishing tank 42 for additional clarification. Water from second polishing tank 42 is then pumped into a clarified water barge 44 which will return the clarified water to the site of the dredging operation 10.

Even though FIG. 2 depicts a decant barge 36 for processing water pumped from the treatment vessel 26, it should be understood by one skilled in the art that water treatment may alternatively occur at the land based water treatment facility using techniques that are common in the art. In addition, it should be noted that the treated or clarified water may be recycled for use at a later stage of the solidification and stabilization process of dredged materials 28. For example, the clarified water may be mixed with an additive slurry (as will be discussed in more detail below) and pumped into the dredged materials 28. This approach is preferable particularly when contaminants such as heavy metals are entrained within the clarified water and would require treatment prior to disposal or redepositing in waterway 14.

Figure 3:
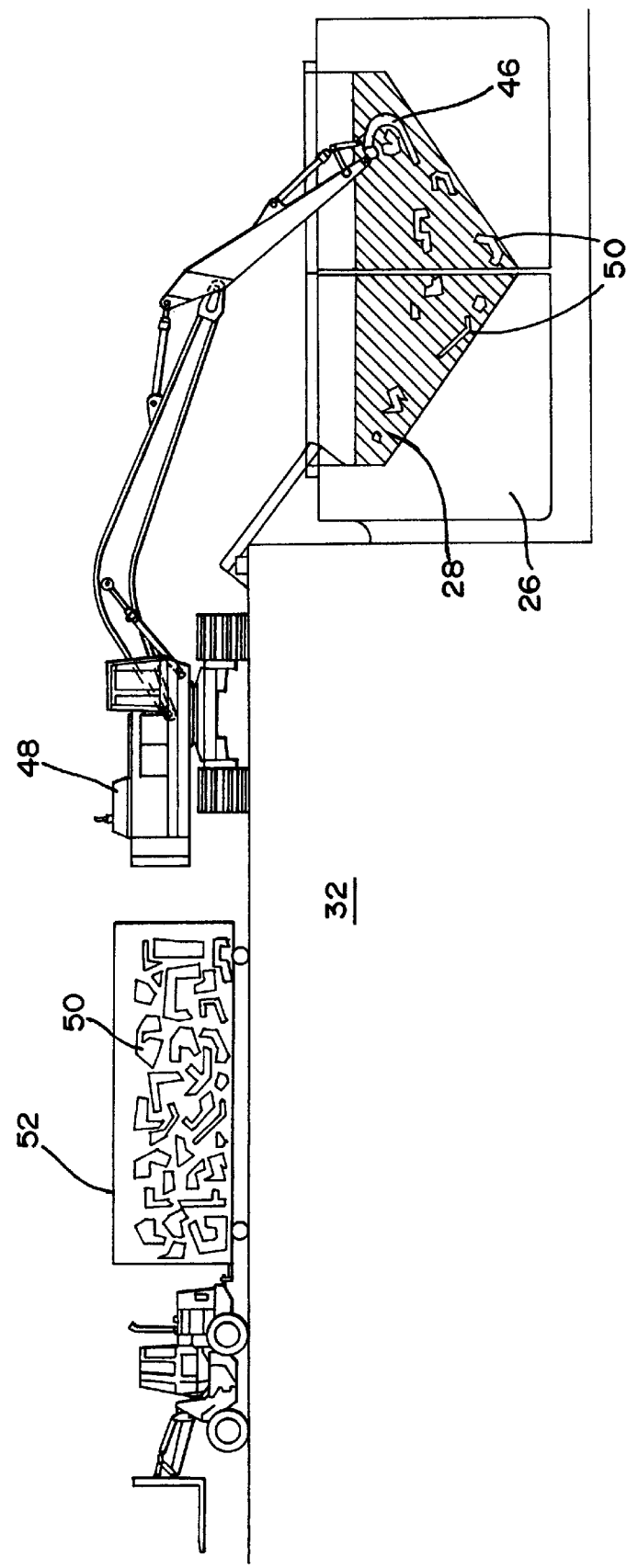
FIG. 3 is a schematic illustration of a debris rake removing debris from dredged materials in a treatment vessel.

After the free standing water is pumped off the dredged materials 28 in the treatment vessel 26, a debris rake 46 attached to a rake apparatus 48 is used to remove debris 50 from the dredged materials 28 as best seen in FIG. 3. The raking step eliminates large objects that must be removed from the dredged material 28 to protect the mixing assembly 56 and to engineer the dredged materials 28 to the desired consistency which will allow for the production of a substantially homogeneous end product, for example, an end product that is suitable for beneficial re-use as an engineered structural fill.

The debris rake 46 may comprise a single hook or a plurality of tines which are spaced apart such that large objects on the order of 2–10 feet and small objects on the order of 6 inches are removed from the dredged materials 28. After the debris 50 is removed from the dredged materials 28, the debris 50 is placed in a debris container 52 that can be transported off for further processing, decontamination or disposal.

Figure 4:
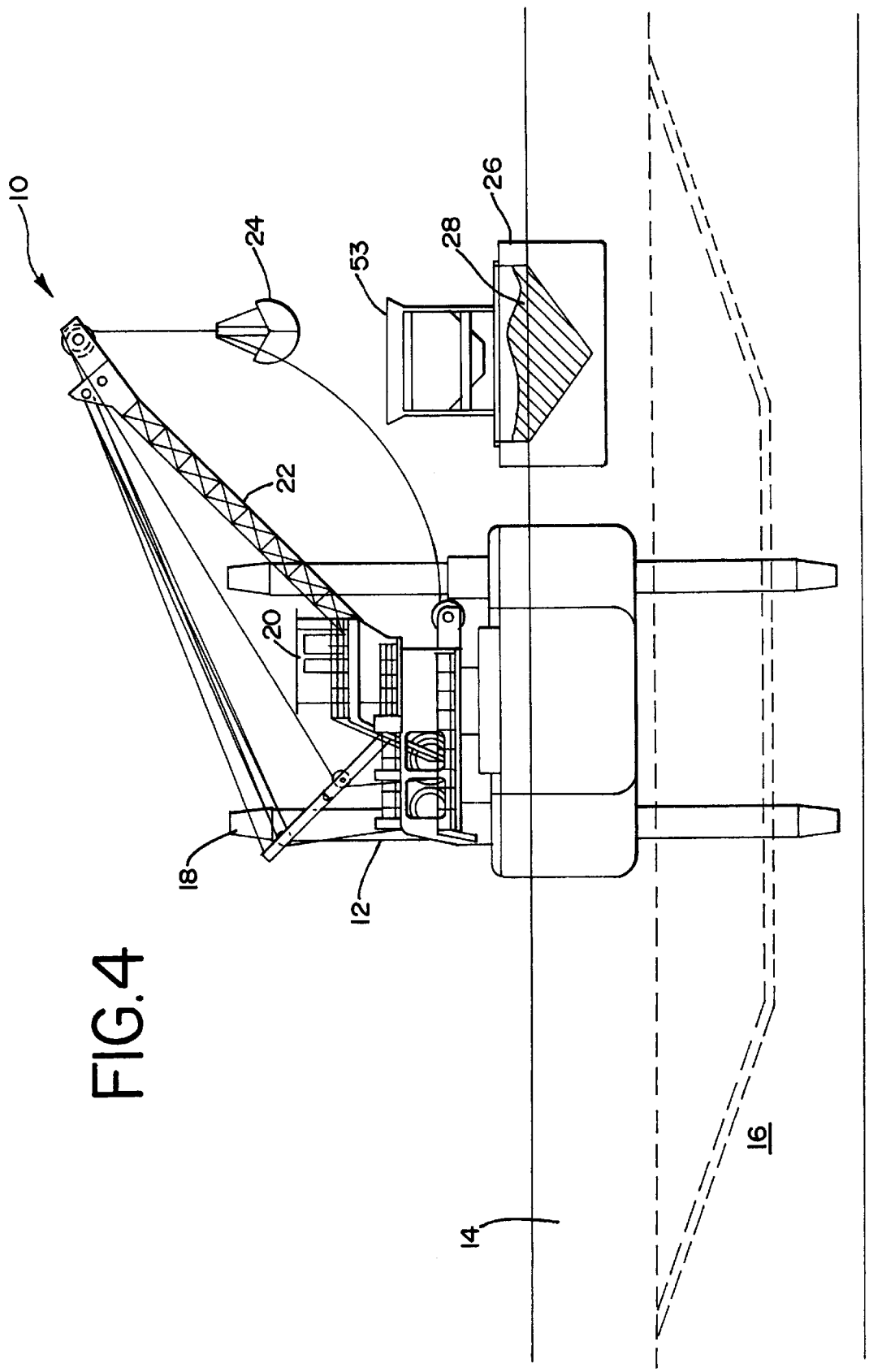
FIG. 4 is a schematic illustration of a dredging vessel loading dredged materials into a hopper.

Alternatively, debris 50 may be separated prior to loading the treatment vessel 26 with the dredged materials 28. For example, as best seen in FIG. 4, the dredged materials 28 may be loaded into a hopper 53 from clamshell 24. The hopper 53 may include one or more vibrating screens which separate oversized materials such as debris 50 from the dredged materials 28. The oversized materials may then be placed in one compartment in treatment vessel 26 while the remainder of the dredged materials 28 are placed in a separate compartment within the treatment vessel 26. Alternatively, a non-vibrating screen may be used to separate oversized particles from the debris 50. The non-vibrating screen may be placed within the hopper 53 or directly over the containment area within treatment vessel 26.

Figure 5:
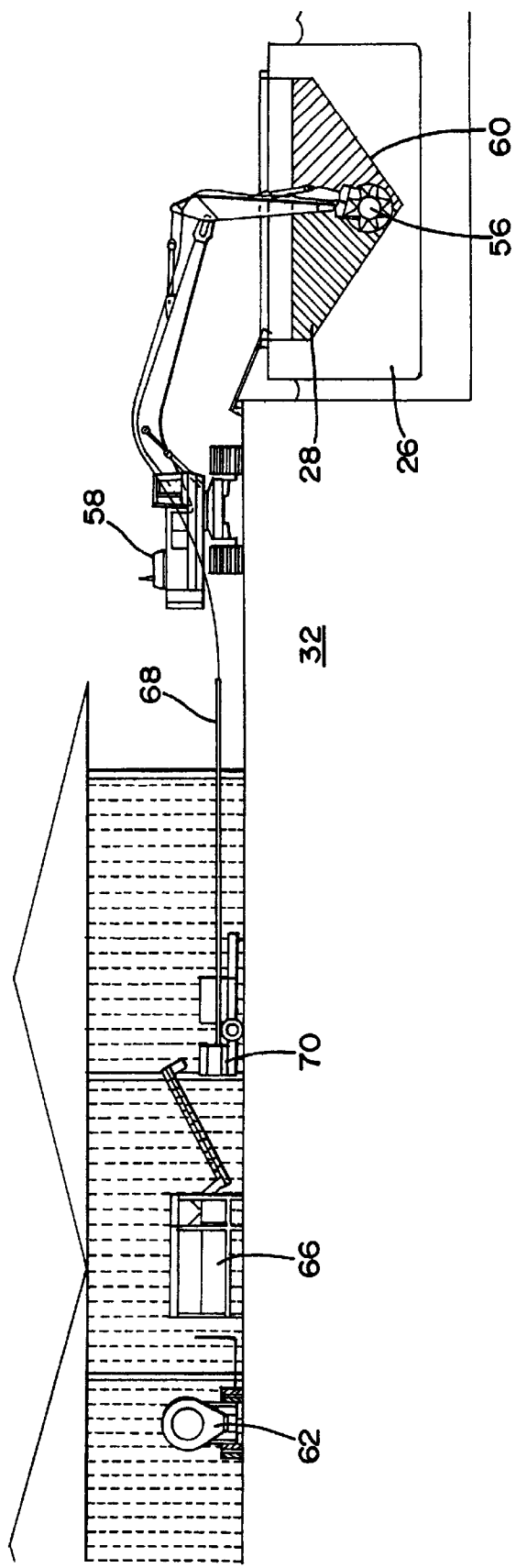
FIG. 5 is a schematic illustration of a mixing assembly attached to a mixing apparatus for stabilizing dredged materials in a treatment vessel.
Figure 6:
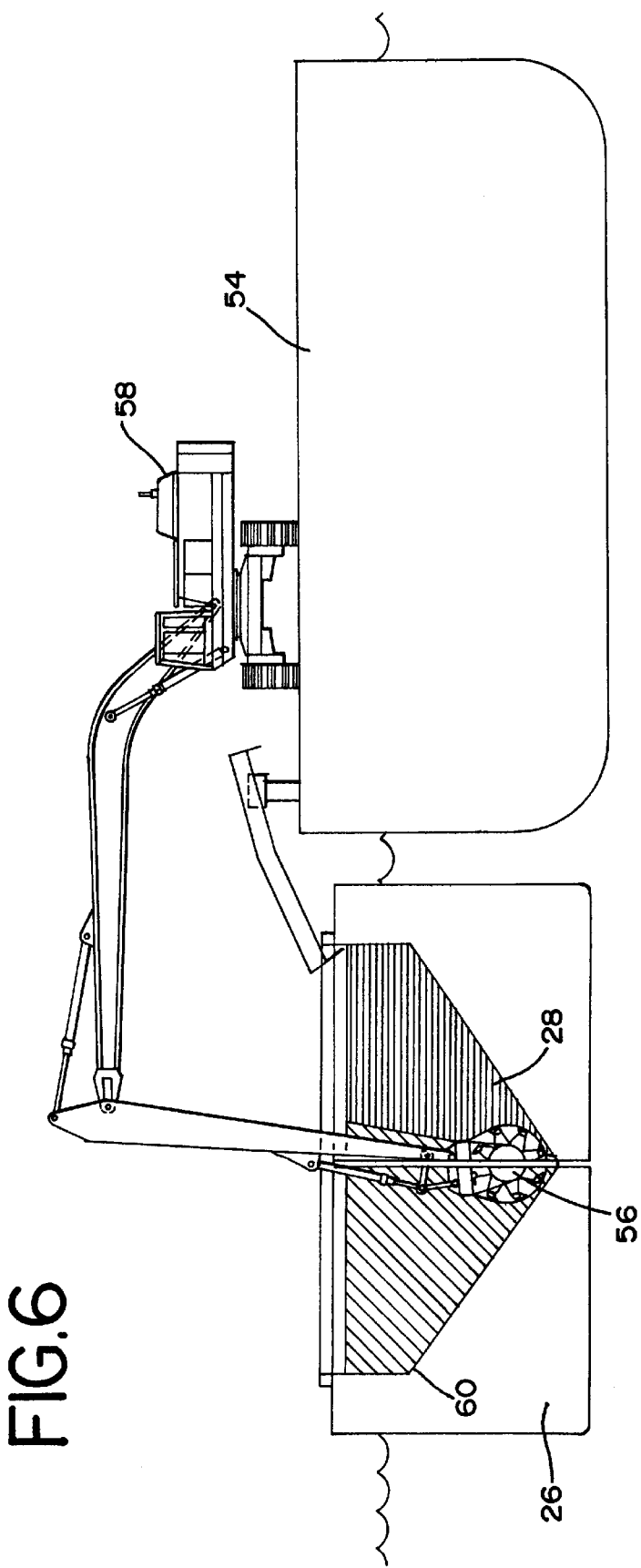
FIG. 6 is a schematic illustration of a mixing assembly attached to a mixing apparatus positioned on a barge.

After the removal of standing water and debris from the dredged materials 28 and now referring to FIGS. 2, 5 and 6, the original treatment vessel 26 that was filled with the dredged materials 28 at dredging operation 10 is towed to a position along dock 32 or adjacent to a barge 54 for the treatment process.

Importantly, in one embodiment of the present invention, the dredged materials 28 are not transferred from one treatment vessel 26 to another or from the treatment vessel 26 to a land based treatment operation thus minimizing the potential environmental impact of the treatment process. Once in place, a mixing assembly 56 attached to a mixing apparatus 58 is placed in the treatment vessel 26 within the dredged materials 28.

During the treatment process, a slurry of additives may be pumped into the dredged materials 28 as the mixing assembly 56 rotates, thereby transforming the dredged materials 28 into a homogeneous mixture 60.

The additives, if necessary, may comprise a cement-based additive, such as Portland Cement. In addition or alternatively, the additives may comprise high alkali additives such as CaO, $Ca(OH)_2$ and $CaCO_3$, or mixtures thereof. In addition or alternatively, the additives may comprise $FeCl_3$, coal ash, fly ash, bed ash, cement kiln dust, lime kiln dust, clay slag, sodium silicate, calcium silicate, wood chips, ground corn cobs, diatomaceous earth, natural soil, or mixtures thereof. In addition or alternatively, the additives may comprise iron salts, ferrous sulfate, magnesium salts, silica, asphalt emulsions, alcohols, amides, amines, carboxylic acids, carbonyls, sulfonates, activated carbons, sodium carbonates, potassium permanganate, calcium hypochlorite, sodium hypochlorite or mixtures thereof. A total additive concentration on the order of 1 to 30 percent, by volume of the dredged materials 28, is appropriate. A concentration of approximately 1 to 15 percent is preferred. The concentration chosen will be a function of the type, composition, moisture content and contamination level of the dredged materials 28, as well as the desired characteristics of the end product, for example, for beneficial re-use as an engineered structural fill.

It should be noted that in the event that anaerobic activity is present in the dredged materials 28 which may prevent or delay the solidification of the dredged materials 28, compressed air or oxygen may be introduced into the dredged materials 28 by, for example, bubbling the air or oxygen through the dredged materials 28. In addition to introducing air or oxygen into the dredged materials 28, one or more of the above-identified additives may be added to the dredged materials 28 to minimize anaerobic activity.

Additives may be received from ground transportation 62 and transferred to silos 64 for storage. The additives may be combined in a mixer 66 to form a slurry that is pumped through supply lines 68 via pump 70 directly to the mixing assembly 56. The additives are introduced into the dredged material 58 in the form of a slurry to promote uniform mixing and to reduce the potential for particulate emissions. It will be understood by one skilled in the art that other methods for the transfer of dry additives from the silos 64 directly to the mixing assembly 56, such as pneumatic transfer or via a conveyer, may also be used without departing from the principles of the present invention.

In addition to further dehydrating the dredged materials 28, the physical and chemical treatment performed by mixing apparatus 58 greatly improves the compressive strength and the bearing strength of mixture 60. Following a curing process, which may last between about one and ten days, the mixture 60 becomes a highly impermeable material 69 which has a compressive strength that exceeds 30 psi. Following the curing process, the material 69 is suitable for beneficial re-use as an engineered structural fill material. It should be noted that the curing of mixture 60 continues beyond the above specified time period as the compressive strengths are typically considered with respect to 28-day strength.

Figure 7:
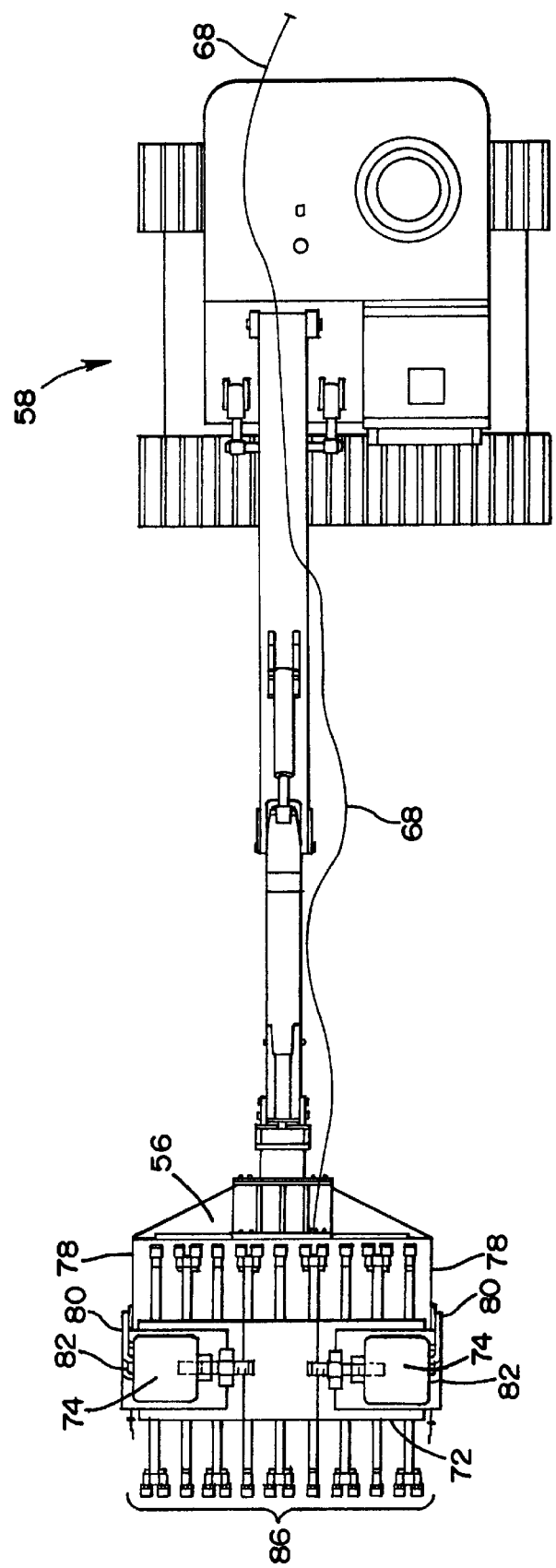
FIG. 7 is a bottom view of a mixing apparatus with a mixing assembly attached thereto.
Figure 8:
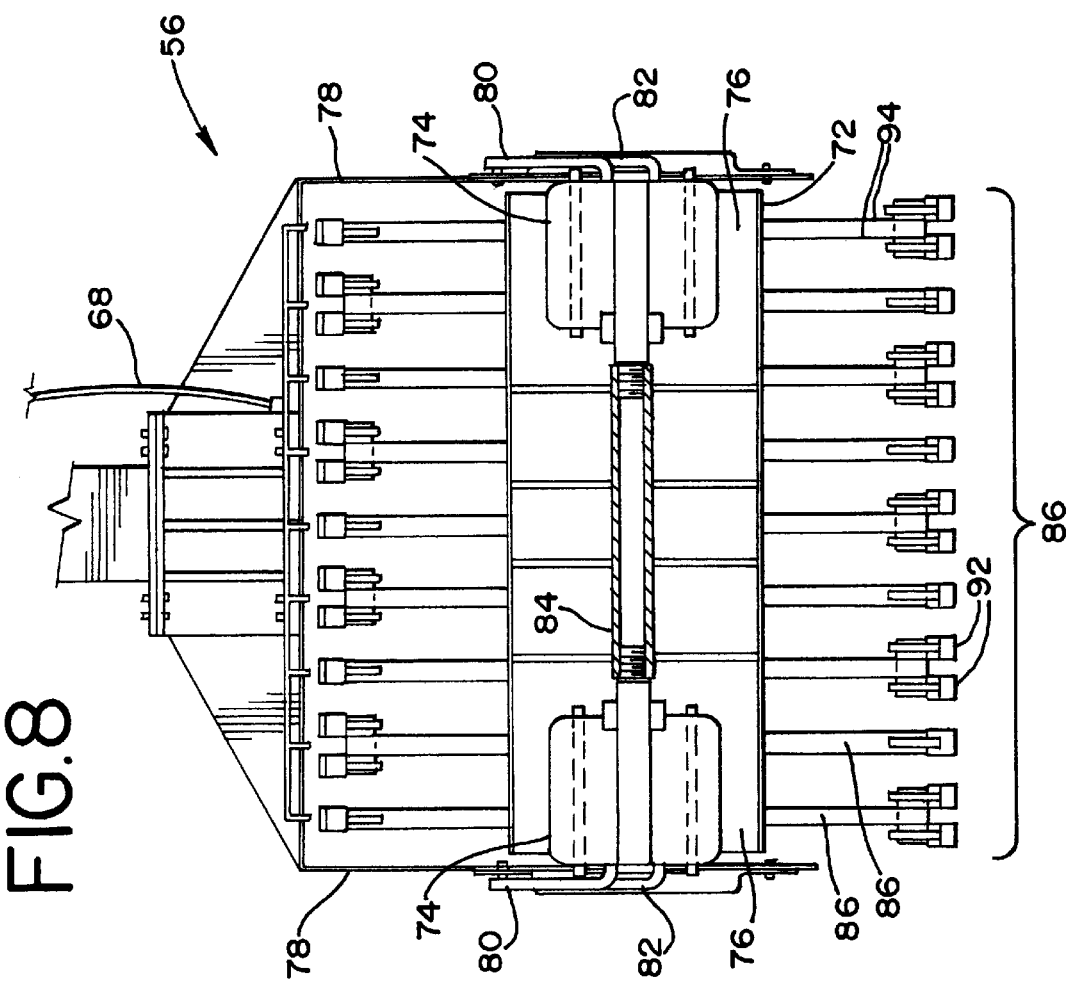
FIG. 8 is a front view partially in section of a mixing assembly of the present invention.
Figure 9:
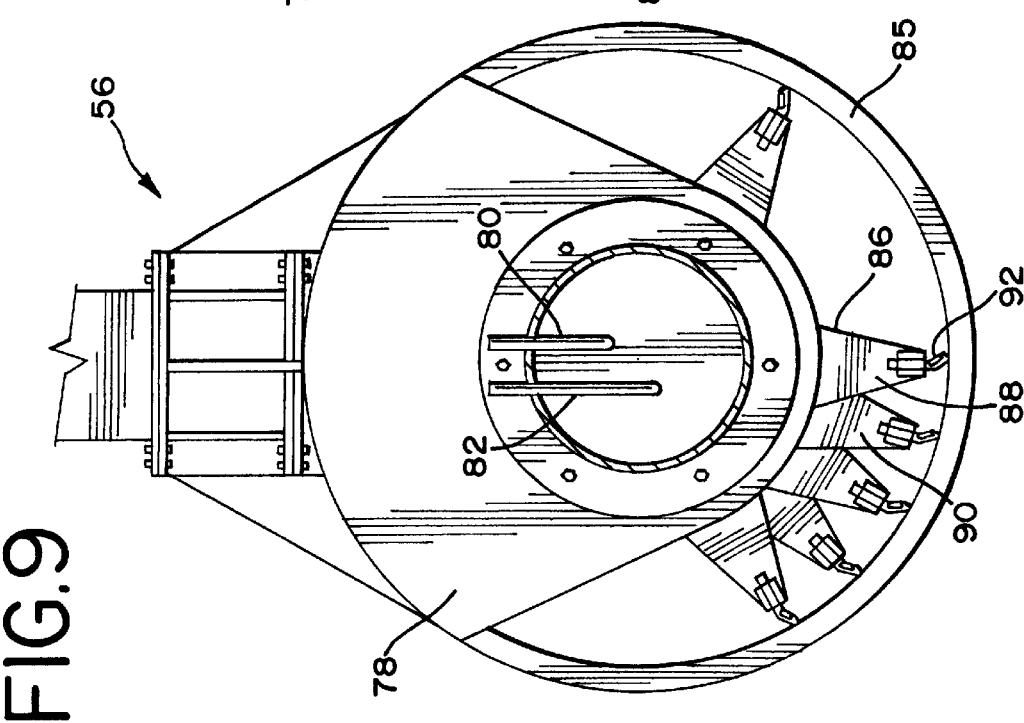
FIG. 9 is a side view of a mixing assembly of the present invention.

Now referring to FIGS. 7–9, one embodiment of the mixing assembly 56 is depicted. The mixing assembly 56 includes a heavy duty tine shaft 72 which is configured such that hydraulic drive motors 74 can be located within the cavities 76 of the tine shaft 72. Placement of the hydraulic motors 74 within the shaft 72 protects the hydraulic motors 74 from unnecessary contact with the dredged material 58.

The hydraulic drive motors 74 are attached to yoke arms 78 via a series of mechanical components. The shaft 72 is rotatably supported by yoke arms 78. Hydraulic fluid is pumped into and out of the hydraulic motors 74 through hydraulic lines 80, 82. The hydraulic drive motors 74 apply torque to the torque shaft 84, thereby affecting rotation of the shaft 72. A sensor may be used to detect information indicative of torque on the mixing assembly 56 which is displayed to the user of the mixing apparatus 58 as an indication of the consistency of the dredged materials 28. A rub bar 85 may be disposed about the mixing assembly 56 to prevent contact between the rotating tines 86 and the interior surfaces of the treatment vessel 26.

As indicated in FIG. 9, the tines 86 may be cast as part of a star shaped pattern, with the tines 86 as the arms of the star. The angular position of the tines 86 may be staggered relative to each other, from one star shaped set 88 to the next 90. One or more chisel-like teeth 92 may be affixed to the end of each tine 86. As best seen in FIG. 8, each of the tines 86 may consist of a pair of spaced apart plates 94 providing for a single-toothed tine 86 alternating with a double-toothed tine 86, as an example.

Even though FIGS. 7 and 8 depict alternating single tooth and double tooth designs, it should be noted by one skilled in the art that all tines 86 can have a single tooth or a double tooth design. It should also be noted by one skilled in the art that tines 86 and teeth 92 may be constructed from a single piece of metal such as a half-bracket section that may be bolted or welded directly to shaft 72.

Even though FIGS. 7–9 have described mixing assembly 56 in detail as a horizontal mixer, it should be understood by one skilled in the art that a variety of other mixing assemblies including, but not limited to, a vertical auger mixer or a raking system, may be used without departing from the principles of the present invention.

Figure 10:
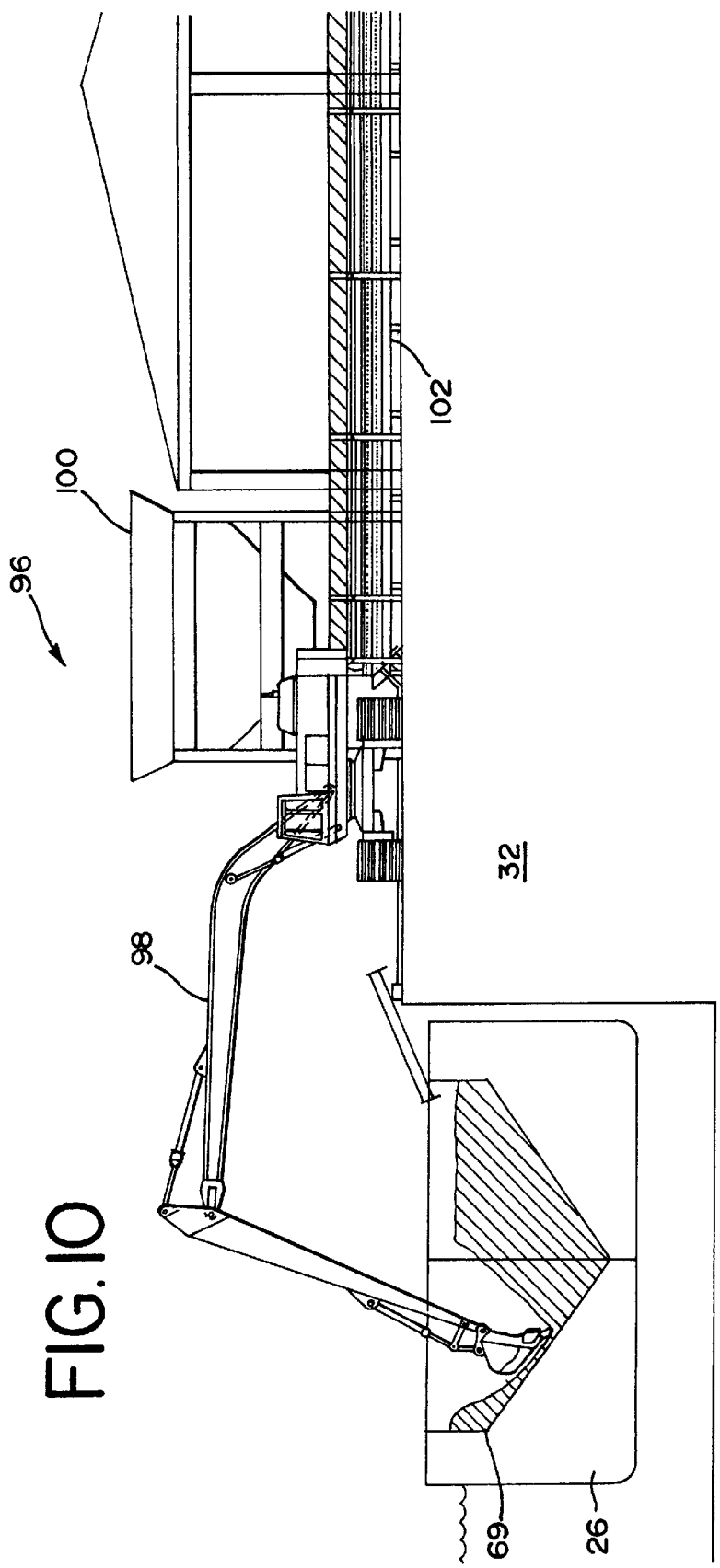
FIG. 10 is a schematic illustration of a land based off-loading apparatus for transferring processed dredged materials into a hopper.

FIG. 10 depicts one method for offloading the material 69 to ground transportation and is generally designated 96. Following the curing process, the treatment vessel 26 is towed to a position next to dock 32 such that a shovel apparatus 98 may scoop the material 69 out of the treatment vessel 26 and place the material 69 into a hopper 100. Through gravitational feed, the material 69 travels through the hopper 100 onto a conveyor 102 which transports the material 69 to another land location.

Figure 11:
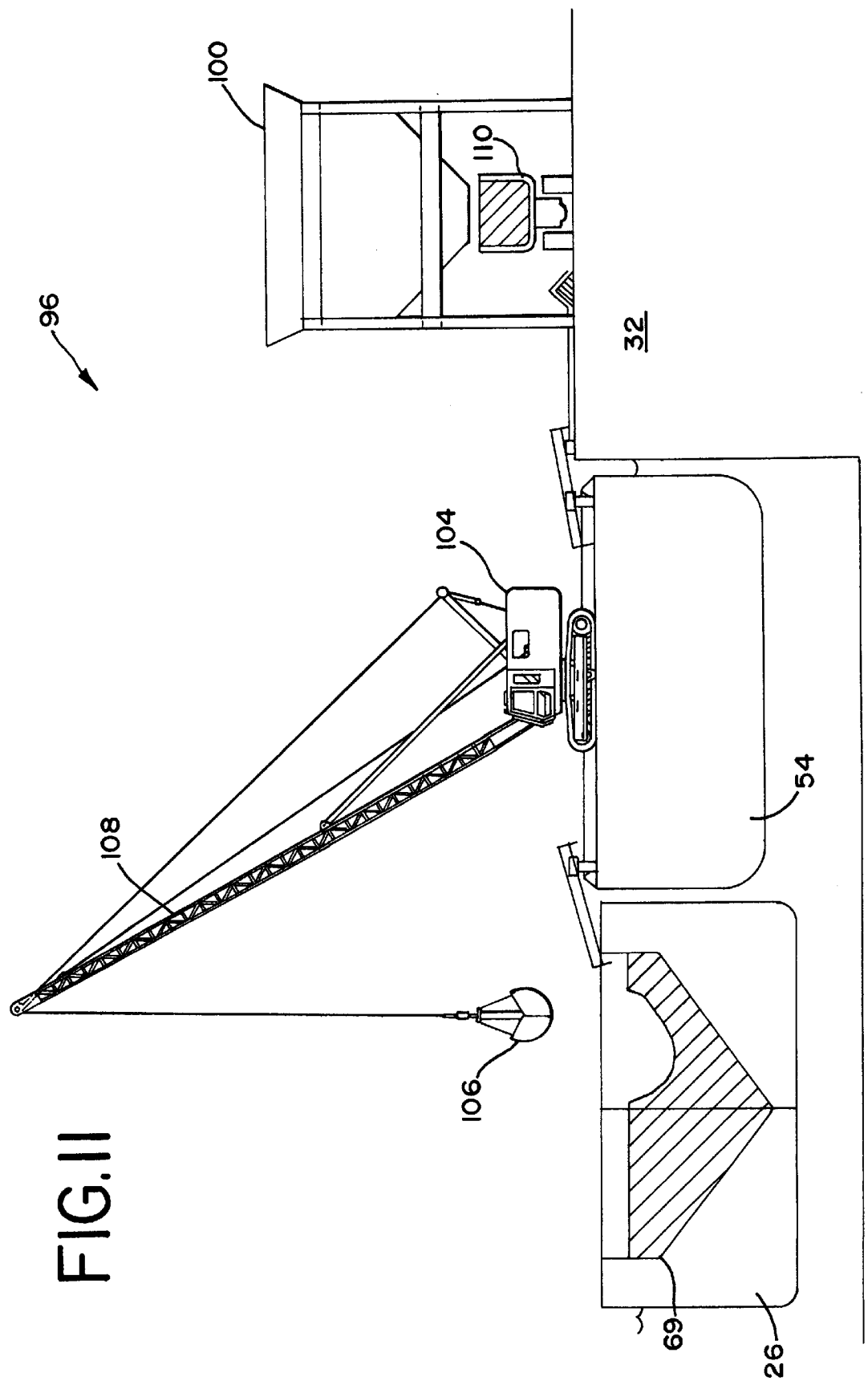
FIG. 11 is a schematic illustration of a crane positioned on a barge loading processed dredged materials into a hopper.

Alternatively, as depicted in FIG. 11, a crane 104 located on a barge 54 scoops the material 69 from the treatment vessel 26 using a clamshell 106 extending from the boom 108. The crane 104 deposits the material 69 into the hopper 100 which feeds directly into ground transportation such as truck 110 or a rail car which may transport the material 69 to another ground location. Similarly, material 69 may be pumped in a pipeline to another ground location.

Figure 12:
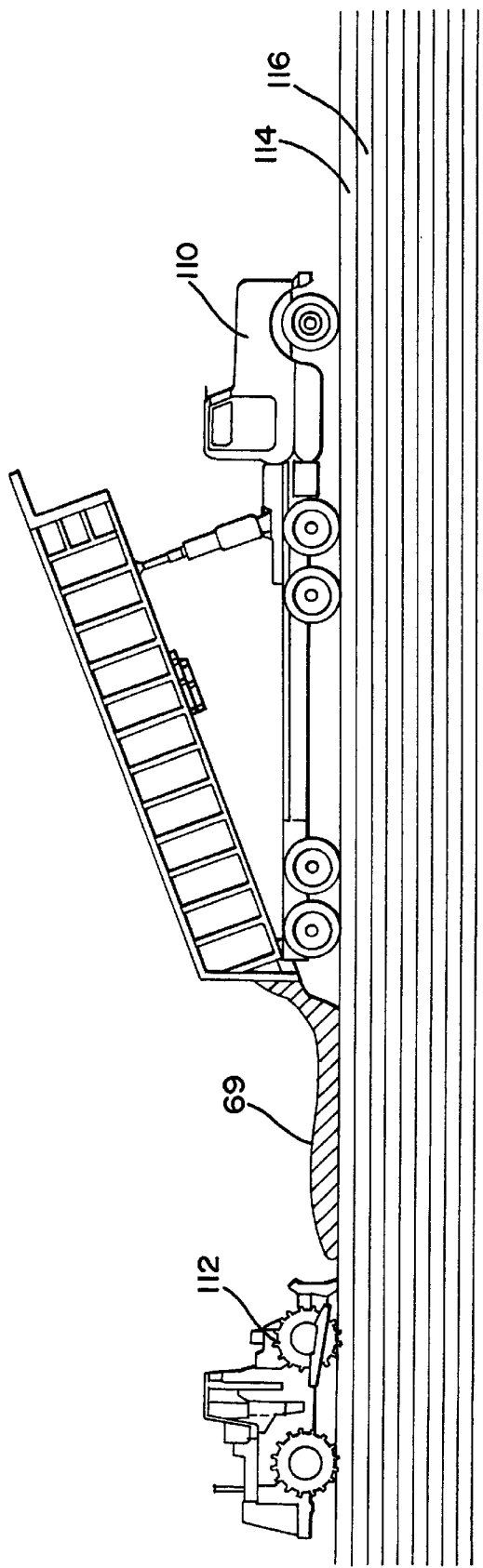
FIG. 12 is a schematic illustration of the beneficial re-use of the mixture of the present invention as a structural fill.

In FIG. 12, a beneficial re-use of the material 69 is depicted. Generally, the beneficial re-use of dredged materials 28 means using the dredged materials 28 as a resource in a productive way. Typically, in considering the beneficial re-use of dredged materials 28, several criteria may be considered including whether the re-use is scientifically and environmentally sound, whether the re-use has public value, and whether the re-use is economically sound. Additionally, the beneficial re-use of dredged materials 28 may dependent upon local regulations, local preferences, environmental impact, grain size (see Table 1) and levels of contamination (see Table 2) in the dredged materials 28.

TABLE 1

| SAMPLE | Gravel >2000 μm | Sand 62.5–2000 μm | Silt 3.9–62.5 μm | Clay <3.9 μm | Percentage of Moisture | TOC dry wt |
|---|---|---|---|---|---|---|
| Sample 1 | 1 | 28 | 45 | 28 | 47 | 1.34 |
| Sample 2 | 0 | 63 | 29 | 8 | 21 | ND |
| Sample 3 | 0 | 16 | 60 | 34 | 44 | 1.26 |
| Sample 4 | 0 | 5 | 61 | 34 | 39 | 1.09 |
| Sample 5 | 1 | 25 | 43 | 31 | 54 | 2.16 |
| Sample 6 | 1 | 28 | 43 | 30 | 46 | 1.77 |
| Sample 7 | 3 | 41 | 34 | 22 | 25 | 0.42 |
| Sample 8 | 1 | 77 | 13 | 9 | 21 | 0.23 |
| Sample 9 | 0 | 34 | 37 | 29 | 48 | 1.83 |
| Sample 10 | 0 | 30 | 36 | 34 | 51 | 2.14 |
| Sample 11 | 1 | 81 | 10 | 8 | 27 | 0.21 |
| Sample 12 | 1 | 44 | 31 | 24 | 44 | 1.13 |
| Sample 13 | 1 | 53 | 29 | 17 | 39 | 0.88 |
| Sample 14 | 1 | 26 | 41 | 32 | 45 | 2.23 |
| Sample 15 | 2 | 64 | 19 | 15 | 35 | 0.83 |
| Sample 16 | 5 | 48 | 24 | 23 | 47 | 2.13 |
| Sample 17 | 0 | 13 | 45 | 42 | 57 | 3.55 |
| Sample 18 | 0 | 16 | 46 | 38 | 60 | 2.94 |
| Sample 19 | 5 | 60 | 19 | 15 | 38 | 1.04 |
| Sample 20 | 3 | 48 | 27 | 22 | 44 | 2.07 |
| Sample 21 | 0 | 14 | 45 | 41 | 55 | 3.11 |
| Sample 22 | 1 | 31 | 38 | 30 | 52 | 2.96 |
| Sample 23 | 0 | 18 | 43 | 39 | 58 | 3.32 |
| Sample 24 | 1 | 41 | 32 | 26 | 50 | 2.81 |
| Sample 25 | 3 | 96 | 0 | 1 | 13 | 0.02 |

Table 1 details the composition of a series samples of dredged materials 28 which were analyzed, in total percent by dry weight. It should be noted that these samples are not intended to be representative of typical dredged materials 28 and are presented here as being illustrative only of the composition of dredged materials 28 obtained from a single location as it is well known in the art that the composition of dredged materials 28 will vary from location to location.

As the samples indicate, the majority of the constituents of the dredged materials 28 have a particle size of less than 2000 μm with a majority of some samples having a particle size of less than 62.5 μm. The dredged materials 28, in the samples, have a high moisture content ranging between 13 and 60 percent. Given the particle size and the moisture content of the dredged materials 28, it is infeasible to re-use the dredged materials 28 in their virgin form because of the moisture content and a lack a structural strength.

Alternatively, if the dredged materials 28 are allowed to dry without the benefit of the additives of the present invention, the dredged materials 28 become a powdery, dust-like substance with minimal strength and compaction characteristics that prevent beneficial re-use of dredged materials 28. In addition, the dry form of dredged materials 28 may have an adverse environmental impact as a particulate. Thus, in order to beneficially re-use the dredged materials 28, additives such as Portland Cement are blended thoroughly into the dredged materials 28 to form a substantially homogeneous materials 69. This treatment process chemically and physically alters, through fixation, solidification and stabilization, the finer elements of the dredged material 28 so that, upon hydration, the material 69 gains structural strength and a soil-like material while minimizing the likelihood of wind-born fugitive dust emissions.

Additionally, the dredged materials 28 may contain a variety of contaminants, including heavy metals, such as Ag, As, Cd, Cr, Cu, Hg, Ni, Pb and Zn. These and other metals are typical constituents in industrial waste water discharges and runoffs that form sediment 16. In addition to these metals, other contaminants such as dioxins, PCBs, pesticides as well as other organic and inorganic industrial pollutants may also be present in the dredged material 28 which, along with the metals, may require treatment prior to the use of the dredged materials in a beneficial re-use scenario.

To transform the dredged materials 28 into the material 69 an additive is added thereto. For example, the additive may have a first agent, such as Portland Cement, and a second agent selected from the group consisting of CaO, $Ca(OH)_2$ and $CaCO_3$, $FeCl_3$, coal ash, fly ash, bed ash, cement kiln dust, lime kiln dust, clay slag, calcium silicate, wood chips, ground corn cobs, diatomaceous earth, natural soil, iron salts, ferrous sulfate, magnesium salts, silica, asphalt emulsions, alcohols, amides, amines, carboxylic acids, carbonyls, sulfonates, activated carbons, sodium carbonates, potassium permanganate, calcium hypochlorite, sodium hypochlorite or mixtures thereof. In one embodiment, the concentration of the first agent is between about 1 and 15 percent by weight of dredged material 28 and the concentration of the second agent is between about 1 and 12 percent by weight of dredged material 28.

After processing, the material 69 is transported to the desired location via ground transportation, such as truck 110, rail cars or a conveyor. For example, truck 110 which may be equipped with sealed gates such that truck 110 may be loaded directly from treatment vessel 26, hopper 100 or by a front end loader at a stockpile of the material 69. The material 69 may be stockpiled to provide additional cure time which is directly related to the compressive strength of the material 69.

If the material 69 is in a stockpile, it is monitored to determine the status of the curing process so that the material 69 may be moved to its intended beneficial re-use location at the proper time to achieve an engineered design as a structural fill. The stockpile will also allow the material 69 to reach its desired moisture content level such that the compaction and permeability characteristics of the material 69 are suitable for the intended beneficial re-use of material 69 such as for an engineered structural fill material.

Once the material 69 has reached the site for its beneficial re-use, the material 69 is dumped out of truck 110 and is compacted using a compactor 112. The compaction process creates a plurality of highly impermeable layers or lifts, such as 114, 116.

The material 69 is suitable for a variety of beneficial re-use applications. For example, the material 69 may be used as a liner protective cover, a daily cover or a final cap over a landfill, for strip mine reclamation, or as a cap for a "Brownfield" property or in another environmental remediation plan. Material 69 may also be used for as a paving material for parking lots, airfield construction, road base or other Department of Transportation projects. In addition, material 69 may be used for beach nourishment or habitat development projects as well as for other uses the require the use of structural fill. Thus, the method for treatment of dredged materials 28 to form an engineered structural fill material 69 of the present invention not only removes the sediment 16 from the bottom of the waterway 14, but also, provides for the capping of contaminated or formerly contaminated land making it suitable for industrial, commercial or residential redevelopment.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for producing a structural fill material comprising the steps of:
   obtaining a dredged material;
   depositing the dredged material into a containment receptacle;
   removing free water from the dredged material and the containment receptacle;
   creating an additive slurry in a mixing container;
   pumping the additive slurry from the mixing container to a mixing assembly disposed within the containment receptacle;
   mixing the additive slurry into the dredged material to form a substantially homogenous mixture; and,
   curing the substantially homogenous mixture in the containment receptacle, thereby producing a structural fill material and reducing particulate emissions.

2. The method as recited in claim 1 wherein the additive slurry is selected from the group consisting of CaO, $Ca(OH)_2$, $CaCO_3$, $FeCl_3$, natural soils and mixtures thereof.

3. The method as recited in claim 1 wherein the additive slurry is selected from the group consisting of CaO, $Ca(OH)_2$, $CaCO_3$, $FeCl_3$, coal ash, fly ash, bed ash, cement kiln dust, lime kiln dust, clay slag, calcium silicate, wood chips, ground corn cobs, diatomaceous earth, natural soil, or mixtures thereof.

4. The method as recited in claim 1 wherein the additive slurry is selected from the group consisting of iron salts, ferrous sulfate, magnesium salts, silica, asphalt emulsions, alcohols, amides, amines, carboxylic acids, carbonyls, sulfonates, activated carbons, sodium carbonates, potassium permanganate, calcium hypochlorite, and sodium hypochlorite.

5. A method for producing a stabilized dredged material comprising the steps of:
   obtaining a dredged material;
   depositing the dredged material into a containment receptacle;
   removing free water from the dredged material and the containment receptacle;
   creating an additive slurry in a mixing container;
   pumping the additive slurry from the mixing container to a mixing assembly disposed within the containment receptacle;
   mixing the additive slurry into the dredged material to form a substantially homogenous mixture wherein the additive further comprises a first agent, Portland Cement, and a second agent selected from the group consisting of CaO, Ca(OH)2, CaCO3, FeCl3, natural soils and mixtures thereof; and,
   curing the substantially homogenous mixture in the containment receptacle, whereby producing a stabilized dredged material and reducing particulate emissions.

6. The method as recited in claim 5 wherein the concentration of the first agent is between about 1 and 15 percent by weight of the dredged material and the concentration of the second agent is between about 1 and 12 percent by weight of the dredged material.

7. A method for producing a stabilized dredged material comprising the steps of:

obtaining a dredged material;

depositing the dredged material into a containment receptacle;

removing free water from the dredged material and the containment receptacle;

creating an additive slurry in a mixing container;

pumping the additive slurry from the mixing container to a mixing assembly disposed within the containment receptacle;

mixing the additive slurry into the dredged material to form a substantially homogenous mixture wherein the additive further comprises a first agent, Portland Cement, and a second agent selected from the group consisting of CaO, Ca(OH)2, CaCO3, FeCl3, coal ash, fly ash, bed ash, cement kiln dust, lime kiln dust, clay slag, sodium silicate, calcium silicate, wood chips, ground corn cobs, diatomaceous earth, natural soil, or mixtures thereof; and, curing the substantially homogenous mixture in the containment receptacle, whereby producing a stabilized dredged material and reducing particulate emissions.

8. The method as recited in claim 7 wherein the concentration of the first agent is between about 1 and 15 percent by weight of the dredged material and the concentration of the second agent is between about 1 and 12 percent by weight of the dredged material.

9. A method for producing a stabilized dredged material comprising the steps of:

obtaining a dredged material;

depositing the dredged material into a containment receptacle;

removing free water from the dredged material and the containment receptacle;

creating an additive slurry in a mixing container;

pumping the additive slurry from the mixing container to a mixing assembly disposed within the containment receptacle;

mixing the additive slurry into the dredged material to form a substantially homogenous mixture wherein the additive further comprises a first agent, Portland Cement, and a second agent selected from the group consisting of iron salts, ferrous sulfates, magnesium salts, silica, asphalt emulsions, alcohols, amides, amines, carboxylic acids, carbonyls, sulfonates, activates carbons, sodium carbonates, potassium permanganate, calcium hypochlorite, sodium hypochlorite or mixture thereof; and, curing the substantially homogenous mixture in the containment receptacle, whereby producing a stabilized dredged material and reducing particulate emissions.

10. The method as recited in claim 9 wherein the concentration of the first agent is between about 1 and 15 percent by weight of the dredged material and the concentration of the second agent is between about 1 and 12 percent by weight of the dredged material.

11. The method as recited in claim 9 wherein the quantity of the additive slurry added to the dredged materials is between about 1 and 30 percent by weight of the dredged material.

12. The method as recited in claim 9 wherein the quantity of the additive slurry added to the dredged materials is between about 1 and 15 percent by weight of the dredged material.

\* \* \* \* \*